Patented May 28, 1935

2,003,191

UNITED STATES PATENT OFFICE 2,003,191

METHOD OF PRESERVING FRUIT

Wilhelm J. H. Hinrichs, Hamburg, and Hermann Wittkowski, Lockstedt-Niendorf, near Hamburg, Germany No Drawing. Application July 21, 1933, Serial No. 681,660. In Germany March 15, 1933

3 Claims. (Cl. 99—8)

This invention relates to a method of preserving fruit.

It has been repeatedly proposed to produce airtight and moisture-proof coatings by means of latex solutions, but the results hitherto attained are not satisfactory, chiefly due to the fact that the latex solutions contain albumen and other constituents liable to decompose, and which have an injurious effect upon the fruit to be preserved. Attempts to produce airtight and moisture-proof coatings from latex freed from its harmful constituents have likewise not led to useful results, since it was found that absolute air exclusion causes deterioration also.

According to the invention, these drawbacks can be eliminated by employing a latex concentrated at first to a consistency of about 60% by repeated treatment in rapidly rotating centrifugal machines while the concentrated portions thereof are repeatedly washed with ammonia-containing water during the centrifuging step to remove the hygroscopic constituents and those that are liable to decompose. According to the kind of fruit to be preserved, latex prepared in the manner described is then diluted with water to a consistency of approximately 35%–50%, which, however, does not bring about a perfect mixture of latex and water, whereupon the fruit to be preserved is dipped in the mixture to cause the formation of a coating thereon. In order to remove harmful germs from the surface of the fruit a suitable preservative is added to the solution. The protective coating thus obtained, owing to the addition of water, is permeable to air in certain areas as required and protects the fruit treated in the manner described absolutely against deterioration without cutting off the necessary supply of air. A particular advantage of the method according to the invention is that fruit coated in this manner can be transported from tropical countries in ordinary vessels or ordinary railroad freight cars and special refrigerator ships or special railroad cars as hitherto required can be dispensed with. For example, if bananas are to be preserved, the bunches in their entirety are dipped in a caoutchouc latex solution which has been concentrated at first, then diluted to a consistency of about 38% to 47%, freed from harmful constituents and provided with a suitable preservative, such as salicylic or boric acid, whereupon the bunches are lifted out and suspended for drying. They can then be placed in the vessel's hold either in the thus coated manner, or wrapped up in perforated packing paper. In case of smaller fruit, such as apples, oranges, lemons, grapefruit, cucumbers, tomatoes, melons or the like, the protective coating is applied by placing the fruit, immediately after harvesting, on a wire sieve or wire cloth conveyor passing through a latex solution of the kind described above. Having been dried, the fruit is carefully taken from its wire supports, wrapped in paper, and packed in cases or the like.

We claim:—

1. A method of preserving fruits and vegetables which comprises coating the fruit with a latex solution prepared from latex first concentrated by treatment in a rapidly rotating centrifuge and washed with ammonia-containing water, freeing the latex from hygroscopic and decomposable constituents and finally diluting with water, whereby an air pervious coating of latex is procured on said fruits and vegetables.

2. A method of preserving fruits and vegetables which comprises coating the fruit with latex which has been washed with ammoniacal water, concentrated to a dry content of approximately 60%, and then diluted with water to a dry content of approximately 35% to 50%, whereby an air pervious coating of latex is procured on said fruits and vegetables.

3. A method of preserving fruits and vegetables which comprises coating said fruit with a caoutchouc latex which is first concentrated and purified by washing, then diluted with water and to which a preservative has been added, whereby an air pervious coating of latex is procured on said fruits and vegetables.

WILHELM J. H. HINRICHS.
HERMANN WITTKOWSKI.